United States Patent [19]

Merz

[11] Patent Number: 4,617,072
[45] Date of Patent: Oct. 14, 1986

[54] METHOD FOR PRODUCING A COMPOSITE CERAMIC BODY

[75] Inventor: Herbert Merz, Munich, Fed. Rep. of Germany

[73] Assignee: MTU Motoren-und Turbinen-Union Muenchen GmbH, Munich, Fed. Rep. of Germany

[21] Appl. No.: 633,870

[22] Filed: Jul. 23, 1984

[30] Foreign Application Priority Data

Jul. 30, 1983 [DE] Fed. Rep. of Germany ....... 3327659

[51] Int. Cl.⁴ .............................................. B32B 31/26
[52] U.S. Cl. ......................................... 156/89; 428/35
[58] Field of Search ............................. 156/89; 428/35

[56] References Cited

U.S. PATENT DOCUMENTS

| | | | |
|---|---|---|---|
| 3,137,602 | 6/1964 | Lincoln | 156/89 |
| 3,251,403 | 5/1966 | Smith | 156/89 |
| 3,926,702 | 12/1975 | Oki et al. | 156/89 |
| 4,017,347 | 4/1977 | Cleveland | 156/89 |

*Primary Examiner*—Caleb Weston
*Attorney, Agent, or Firm*—W. G. Fasse; D. H. Kane, Jr.

[57] ABSTRACT

An intermediate member is formed as a semifinished product and includes at least two films or sheets of carbon containing material. Both sheets, such as prepegs, are initially in a still deformable state. One film or sheet is plane, the other is profiled and then the two are bonded to each other, brought into the desired final form and cured. The final form is then heated while air is excluded for coking the carbon so that only a carbon skeleton remains. Such skeleton may be further reinforced by again impregnating the skeleton with a carbon containing resin and again coking. The carbonized or coked final form is enriched by metallic silicon, whereby the silicon precipitates by decomposition. Simultaneously with the enriching step or thereafter the final form is heat treated again to cause the formation of silicon carbide by the reaction $C + SI \rightarrow SiC$.

14 Claims, 9 Drawing Figures

METHOD FOR PRODUCING A COMPOSITE CERAMIC BODY

FIELD OF THE INVENTION

The invention relates to a composite ceramic body and to a method for producing such a body which may be constructed as a fiber-reinforced ceramic body. The ceramic or fiber reinforced ceramic body may have a sandwich type structure.

DESCRIPTION OF THE PRIOR ART

Ceramic materials are required for producing structural components exposed to high thermal loads. Examples of such structural components include hot gas conduits, rigid high temperature insulating devices, high temperature heat exchangers, and many other components exposed to high temperatures under operating conditions. Very often these temperatures are above the utilization temperature limit of known metals. Ceramic materials however are useful at these high temperature ranges. Frequently, it is necessary to construct the ceramic components so that they have a low structural weight while simultaneously providing a high efficiency of stiffness or insulation capability per volume unit of the structural component. For this purpose it is necessary to manufacture the structural components in a weight saving manner which calls for making the walls of such component as thin as possible. Additional requirements involve the high temperature differences to which such components may be exposed. In other words, these components must be capable of taking up the heat expansion occurring between the hot and cold sides, for example, between the hot gas and cold gas channels in a gas turbine or heat exchanger respectively. Additionally, it is necessary that at least the separation walls between the hot gas and the cold gas must be pressure-tight in spite of their small wall thickness. The prior art includes non-metallic heat insulating materials for example, in the form of oxide or silicate ceramic materials provided generally as solid plates shells or bodies and occasionally in the form of sandwich type plates comprising sintered fiber felts enclosed between glazed cover plates or sheets. An example of such sandwich type plates is provided by the heat shield tiles which are employed in the space shuttle program, especially for the re-entry vehicle hull. Such prior art heat insulating materials are oxidation and heat resistant to temperatures of about 1000° C. to 1600° C. However, the ability of these materials to withstand thermal shocks is rather limited.

Non-metallic heat insulations for high temperatures are also known, employing graphite in the form of rigid and/or flexible shells or films enclosing carbon fiber felt intermediate layers. However, while these graphite heat insulation materials are high temperature resistant and thermoshock resistant, their use at temperatures above about 400° C. is possible only under vacuum conditions which means that these materials are not resistant against thermo-oxidation. Accordingly, all of the above mentioned materials are, for example, not suitable for use in connection with heat exchangers.

It is also known to use non-metallic heat exchangers comprising a body of extruded material or material produced by slip casting, having, in both instances, axially extending round or honeycombed type channels. The partitions or the walls forming these channels are either relatively thick or relatively thin, depending on the type of production method, and in any event, they are not gas tight. Another limitation of these materials is seen in that they cannot be used in a continuous counter-current or cross-flow operation due to their limited durability against thermal stresses. As a result, these materials can be used only in a recuperator having a low efficiency due to leakage in the facing end sealing.

It is also known to construct heat exchangers by using extruded ceramic tubular stock and arranging such ceramic tubes or pipes in bundles to form a heat exchanger. Such heat exchangers are operable in a continuous cross-flow type of operation. However, the wall thickness of the ceramic pipes is large due to manufacturing conditions and the heat exchange efficiency is accordingly low. Another problem with this type of structure resides in the pressure-tight connection of the ceramic pipes with the closure covers at the ends. As a result, the pressure losses of cross-current flow heat exchangers having a high number of pipes in a bundle is very high, since pressure-tight seals are hard to make.

OBJECTS OF THE INVENTION

In view of the above it is the aim of the invention to achieve the following objects singly or in combination:

to provide a composite body of ceramic material or fiber reinforced ceramic material which has a low structural specific weight or density while simultaneously having a high heat and oxidation resistance or durability;

to construct the composite body in such a way that it will have a low over-all weight, yet being gas-tight nevertheless;

to construct such a body in a way that will provide a relatively high stiffness or rigidity so that the body may be shaped for different purposes such as guide vanes or blades for a turbine, hot gas conduits for a thermal engine, or a heating furnace or the like, heat insulation cowls for a hot isostatic press or for hot pressing generally, or for heat treatment devices operating under protective gas conditions, or for carriers for hot gas reaction catalysts and for any other structural components exposed to high thermal stress operating conditions; and to provide a method for manufacturing such a composite ceramic body by employing simple technical manufacturing means.

SUMMARY OF THE INVENTION

According to the invention the composite ceramic body is formed by the following steps. Initially, at least one still deformable plane film or sheet of a carbon containing material is joined to another regularly profiled film or sheet also of carbon containing material. The joining is such that an initially flat intermediate member results which has enclosed therein hollow spaces or hollow channels between the two films or sheets due to the profiling of one of the films or sheets. Once the two or more films or sheets are joined or bonded to each other, the initially flat intermediate member is shaped into a desired final form, which is hardened by curing of the final form. Following the curing the final form is heated in an enclosed space from which the air is excluded or, preferably, in an inert gas atmosphere. The heating takes place in the temperature range of 600° C. to 1000° C. so that the carbon content is carbonized or coked and the remaining material is burned out. The regular profiling in one of the sheets or films can have any desired wave-form, for example, a trapezoidal shape or a corrugated shape, or a burl or nap pattern. The profiling of one of the films or sheets may even have a hat shape.

If it is intended to further strengthen the carbon skeleton remaining after the first heat treatment, it is possible to subject the composite structure or final form to a resin impregnating operation followed by a second or further heating step resulting in a burn out of the non-carbonaceous material and a filling of the porous interstices which resulted from the first heating step for the coking.

Subsequent to the first coking step which is performed in a temperature range of 600° C. to 1000° C. under air exclusion, the final form or shape is enriched with silicon. Enriching may be accomplished by dipping the final form into a molten silicon bath or by impregnating the final form with an organic silicon compound. Yet another way of providing the required silicon is to expose the final form or shape to silicon containing vapors to provide silicon precipitation by decomposition. Examples of silicon containing substances are the silane or organic materials from the polycarbosilane groups which may be decomposed in the temperature range of 150° to about 850° C. depending on specific formulation and deposition velocity, i. e. necessary reactivity. One specific example: dichlorodiethylsilane $(C_2H_5)_2SiCl_2(\sim 150°$ C.). After the silicon enriching step the final shape is exposed to a further heat treatment step at temperatures within the range of 1350° C. to 1800° C. which are sufficient to convert the carbon and silicon by a chemical thermal process into silicon carbide. It has been found that the final shapes so produced and having a sandwich type structure are highly temperature and oxidation resistant throughout their volume or throughout all parts thereof. The silicon carbide is also highly resistant to shock type thermal stress and this also applies to fiber-reinforced silicon carbide in those instances where the film or sheet material initially used is fiber-reinforced. In a preferred embodiment the inventive method, after heating the final form for coking or carbonizing (step g), comprises reimpregnating the carbonized final form with a suitable carbon containing material and recarbonizing the final form and repeating both steps, if necessary, several times, in order to increase the carbon content or density of the final form, respectively.

Suitable carbon containing materials are for example:
Bakelite EP 60/65 ° C.
Phenolic resins: Bakelite Fw 247, 433, 435
Phenolic resins: Bakelite 7912 FL
Polyimide resins: Technochemie H 795, H 800

Carbonization starts around 350° C. and is finished at 800° C., if necessary under pressurized argon or immersion in pressurized resin or tar bath. As a useful temperature region we give 600° C. to 1000° C.

The basic intermediate member comprises a single plane, plate type film or sheet bonded to a profiled film or sheet of the same type of material. This basic member can be covered with a further plane film or sheet to provide the sandwich type structure which as such is still deformable prior to the curing step advancing the carbonization and the precipitation step of silicon in the final form. The joining or bonding of the two or more films or sheets to each other may be accomplished by a suitable adhesive which will be selected in accordance with the type of material used in making the films or sheets. The bonding may also be accomplished by a conventional welding step suitable for the type of material chosen as organic raw material. When several intermediate members are combined, the orientation of these members relative to each other will depend on the intended purpose and the enclosed spaces may be aligned in parallel to each other or they may extend in crossover relationships between adjacent intermediate members. Two or more such intermediate members may be joined to each other by a suitable adhesive containing carbon or they may be welded to each other. In any event, one or several intermediate members are first shaped into the desired final form before the curing step.

It has been found to be advantageous if the starting material for making the films or sheets is a carbon containing thermoplastic or thermosetting material in which the carbon content ranges from 50% by weight to 65% by weight of the film or sheet. However, the invention can also be practiced by using films or sheets made of an organic fiber material, for example paper, fleeces, textiles, or felts which are impregnated with a suitable resin, such as a phenolic resin or the like or a similar substance such as tar having the required high carbon content, preferably within the range of 60% by weight to 80% by weight of the impregnating material.

Instead of using an organic fiber material, it is also possible to use an inorganic fiber material for making the films or sheets. Such inorganic material may have the form of webbings, layered material, fleeces, or felts. Preferably, the fibers used for this purpose are carbon fibers or silicon carbide fibers and the required above mentioned high carbon content is provided by impregnating the fibers in whatever form, with a carbon containing resin, such as phenolic resin or the like.

It has been found to be advantageous to mix the thermoplastic or thermosetting resin of which the films or sheets are made, and/or the resin which is used for the impregnation with proportions of silicon carbide powder, whereby such proportions are within the range of 100% by weight to 300% by weight of the respective resin. In manufacturing the films or sheets of thermoplastic or thermosetting materials it is advantageous to admix so-called short fibers having an average length of 0,5 mm to 3,0 mm with the thermosetting or thermoplastic materials, whereby these short fibers may be of an organic or inorganic nature. The advantage of such short fiber content is seen in that they stabilize the films or sheets during the burn out heating step so that the final form has the desired dimensional and shape stability. The short fiber content is preferably within the range of 5% by weight to 40% by weight of the thermoplastic or thermosetting material. Also, admixtures of thermoplastic or thermosetting material with short fibers and SiC-powder may be advantageous, whereby the same range of contents applies. A particularly advantageous formation of the films or sheets is accomplished by laminating the thermoplastic or thermosetting material onto a substrate of organic or inorganic material. Such substrate may, for example, be a webbing, a layered material, or a fleece or a paper. The thermosetting or thermoplastic material may be laminated or coated onto both sides of the substrate prior to shaping the substrate with its coating to form the plane first film or sheet and to form the profiled second film or sheet.

BRIEF FIGURE DESCRIPTION

In order that the invention may be clearly understood, it will now be described, by way of example, with reference to the accompanying drawings, wherein:

FIG. 7 shows a cover in a sandwich type structure for a heat insulating cowl or the like.

DETAILED DESCRIPTION OF PREFERRED EXAMPLE EMBODIMENTS AND OF THE BEST MODE OF THE INVENTION

Figure 1:
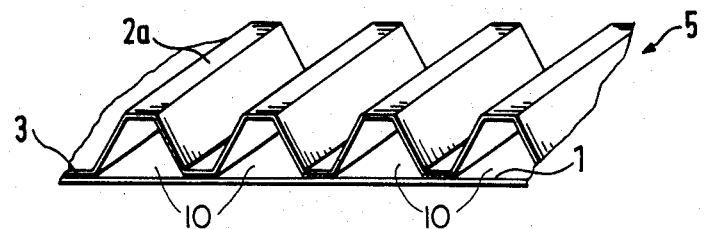
FIG. 1 is a perspective view of a first intermediate member according to the invention, in which the second film or sheet has a trapezoidal configuration.
Figure 2:
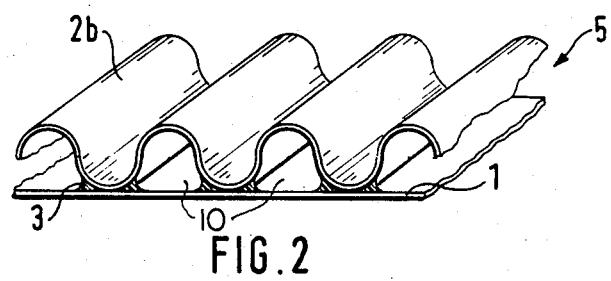
FIG. 2 is a view similar to that of FIG. 1, however, showing an intermediate member with a second film or sheet having a corrugated configuration.

FIGS. 1 and 2 illustrate intermediate members 5 constructed as disclosed herein. A first plane film or sheet 1 is bonded to a second profiled film or sheet 2a having a trapezoid profiling as shown in FIG. 1, or a second film or sheet 2b having a corrugated profiling as shown in FIG. 2. These films or sheets form a matrix material for holding a carbon material to be coked or carbonized. The bonding or joining of the two films to each other is accomplished along bonding locations or seams 3 and the adhesive used may, for example, be a carbon containing adhesive such as a phenolic resin. Instead of an adhesive bonding it is possible to weld the two films or sheets to each other along the locations 3. Heat welding or high frequency welding would be suitable. The invention is not limited to the trapezoidal configuration of the second film as shown at 2a in FIG. 1 nor to the corrugated configuration 2b shown in FIG. 2. Rather, depending on the type of use for which the intermediate members are intended, the second film or sheet may have a profiled configuration resembling that of an egg carton or the profiling may look like naps in a fabric or it may look like a plurality of hats distributed in a predetermined pattern over the second film or sheet, for example, in rows and columns again resembling somewhat an egg carton portion.

Both films or sheets 1 and 2a or 2b are made of a material which is still deformable and has a substantial carbon content as disclosed above. Paper containing the required carbon content is suitable for this purpose. However, other substrate materials are also suitable and they may be of the reinforced or non-reinforced kind, for example webbings, fleeces, layered structures and felt layers are suitable for the present purposes if they are made of organic or inorganic materials and are impregnated with a material providing the required carbon content. Such material could be tar or a phenolic resin. The carbon content should be 50% by weight to 80% by weight. The reinforcing fibers of which the fleeces, webbings, felts, or layered structures are made, could be carbon fibers or silicon carbide fibers, whereby the thickness of the substrate or carbon carrier material may be about 0.3 mm.

Figure 3:
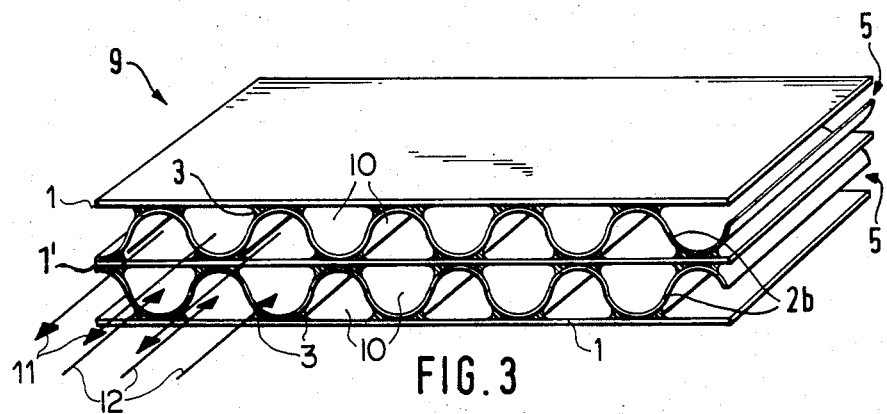
FIG. 3 is a perspective view of an intermediate structure using two intermediate members as shown in FIG. 2 with a third film or layer interposed between the two members.
Figure 4:
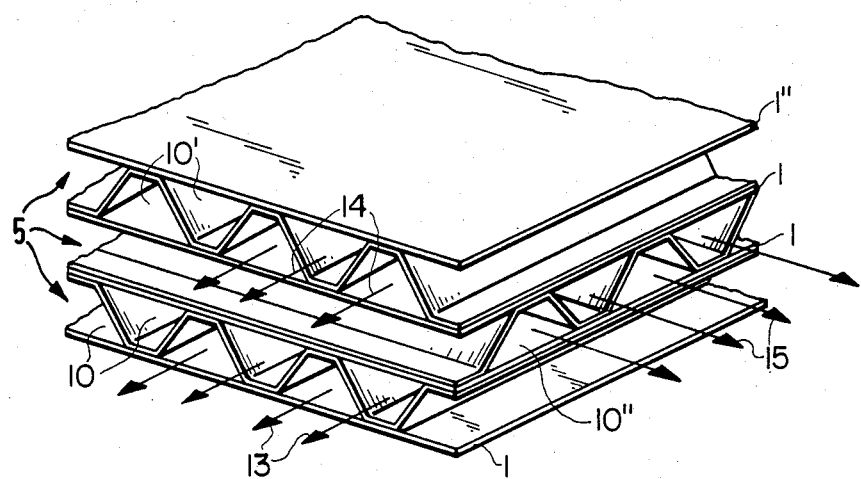
FIG. 4 is a perspective view similar to that of FIG. 3, however, combining three members as shown in FIG. 1.

FIG. 3 combines two intermediate members 5 as shown in FIG. 2 in a sandwich type of structure 9 comprising two outer films or sheets 1 and two profiled sheets or films 2b bonded to the respective outer film or sheet 1 and to an intermediate sheet 1' of the same type of material. The bonding is again accomplished at the bonding locations 3 by a carbon containing adhesive. The enclosed spaces or channels 10 formed between the first and second films or sheets and between the second and third films or sheets are arranged in parallel to each other for a counter-current flow as indicated by the arrows 11 and 12. This type of structure is especially suitable for a heat exchanger operating on the counter-current principle. In the form shown in FIG. 3 the shape of the intermediate member 9 and of the final form after the curing and coking may be the same. However, in FIGS. 1 and 2, the intermediate member 5 is still in the uncured and thus deformable condition. Accordingly, the sheets 1, 2a and 2b are also in the uncured condition or in a partially cured condition which is still permitting the required deformation or shaping into the final form. FIG. 4 illustrates a structure in which three intermediate members 5 as illustrated in FIG. 1 are sandwiched together and covered with a cover film or sheet 1". The channel spaces 10 and the channel spaces 10' are arranged in parallel to each other while the channel spaces 10" are arranged in a crossing relationship relative to the channel spaces 10 and 10'. Thus, the flow of gas, for example, in the lower and upper member is in a direction indicated by the arrows 13 and 14 which may be in the same direction or in a counter-current direction while the flow through the channel spaces 10" is indicated by the arrows 15 showing that the flow is across the other flow direction. In the example shown the cross-over relationship is by 90°. However, other cross-over relationships may be employed if desired, for example, a 45° cross-over relationship might be suitable for certain purposes. The embodiment of FIG. 4 is, for example, suitable for use as a heat exchanger operating in accordance with the so-called cross-flow principle.

Figure 5A:
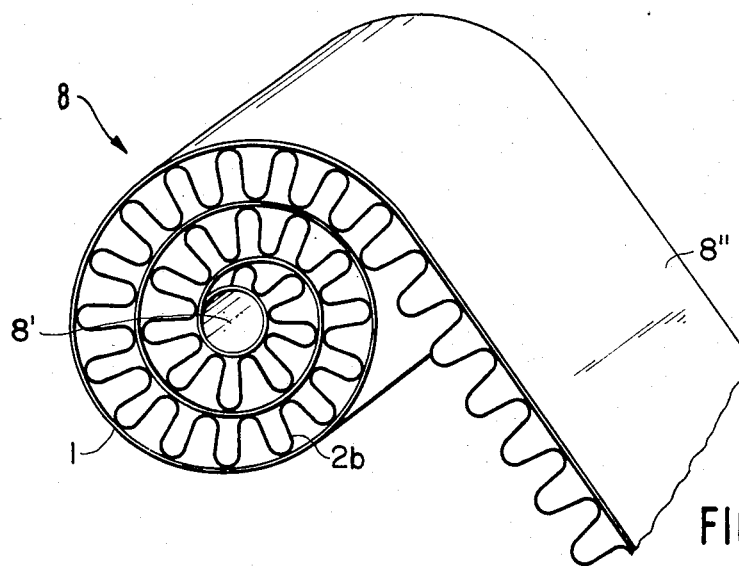
FIG. 5a is a perspective view of an intermediate member as illustrated in FIG. 2 rolled up for forming a heat insulating conduit such as a gas pipe or a recuperator heat exchanger or even a carrier body for a catalyst.

Prior to a complete curing or hardening and prior to the coking heating step, as well as prior to any precipitation of silicon carbide, the intermediate members 5 may be shaped into the so-called final form. FIG. 5a shows one example in which an intermediate member as illustrated in FIG. 2 is being rolled up to form a heat insulating pipe 8 in which the duct 8' is surrounded by the rolled up material, the end 8' of which is secured to the adjacent sheet or film 1 by adhesive or by welding. The structure shown in FIG. 5a is suitable for use as heat insulating pipes or recuperative heat exchangers or the surfaces of the sheets 1 and 2b may be used as carriers for a catalyst for a hot gas reaction, e.g., in connection with the exhaust gas detoxification of combustion gases or for the reaction of gaseous mixtures.

Figure 5B:
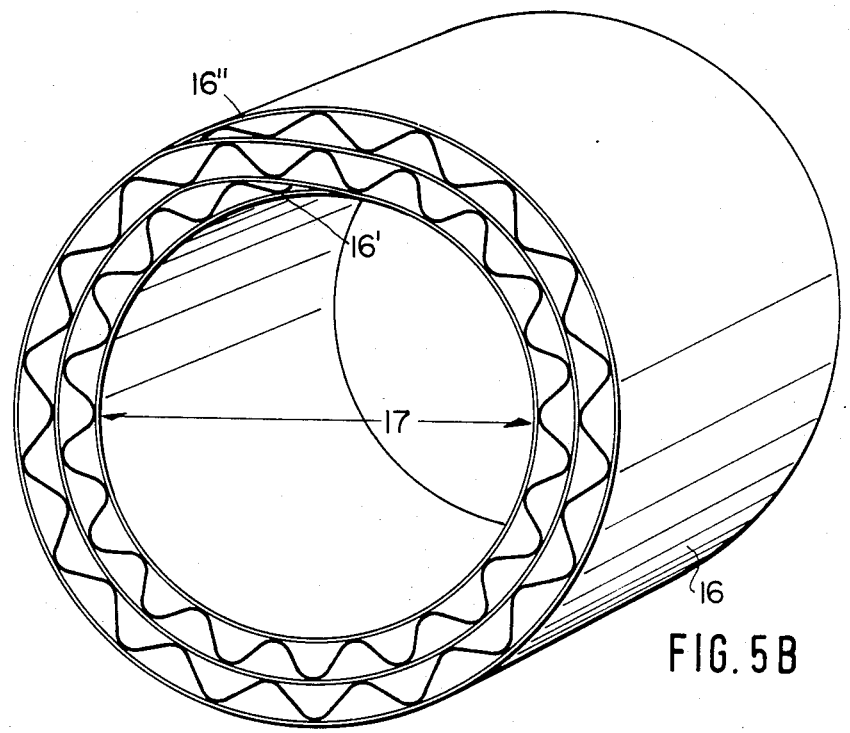
FIG. 5b is a perspective view similar to that of FIG. 5a, however, showing a heat insulating conduit having a cylindrical hollow space to form a gas pipe line or a combustion chamber pipe.

FIG. 5b shows a rolled up intermediate member in its final form 16 having an inner diameter 17 suitable for a hot gas pipeline or for a combustion pipe. The ends 16' and 16" are tapered so as to provide a substantially uniform wall thickness around the entire final form 16.

Figure 6:
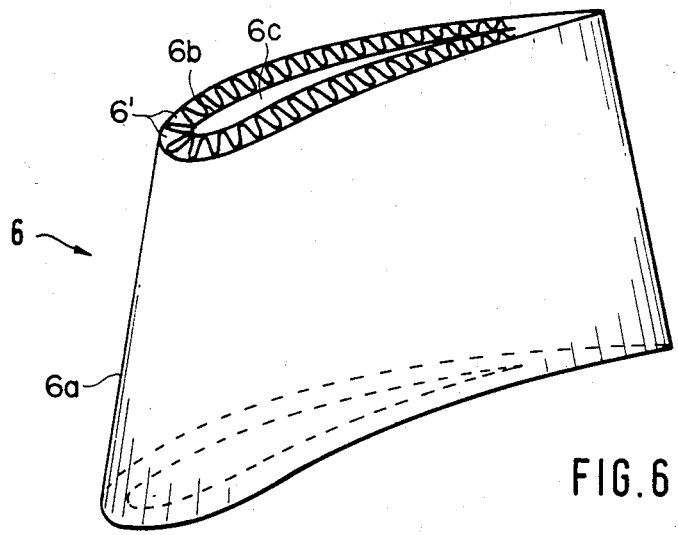
FIG. 6 is a perspective view of a final form shaped by using an intermediate member as illustrated in FIG. 2 to form a guide vane for a gas turbine, whereby the intermediate member of FIG. 2 includes an additonal cover film or layer.

FIG. 6 illustrates a final shape 6 in the form of a guide vane for a gas turbine, whereby a cooling medium may flow through the spaces 6'. An outer film or sheet 6a encloses the guide vane 6 while an inner film or sheet 6b forms or encloses an inner space 6c which may also be used for circulating a cooling medium inside the guide vane.

Figure 7:
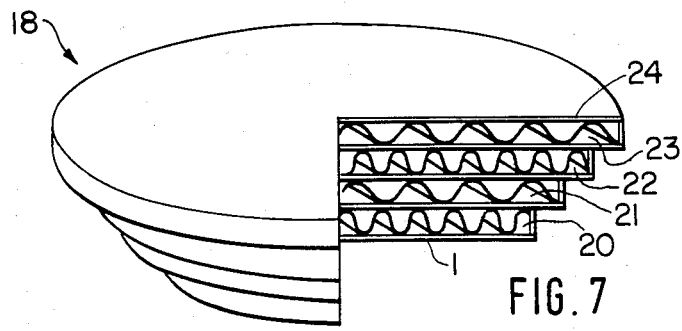
Figure 8:
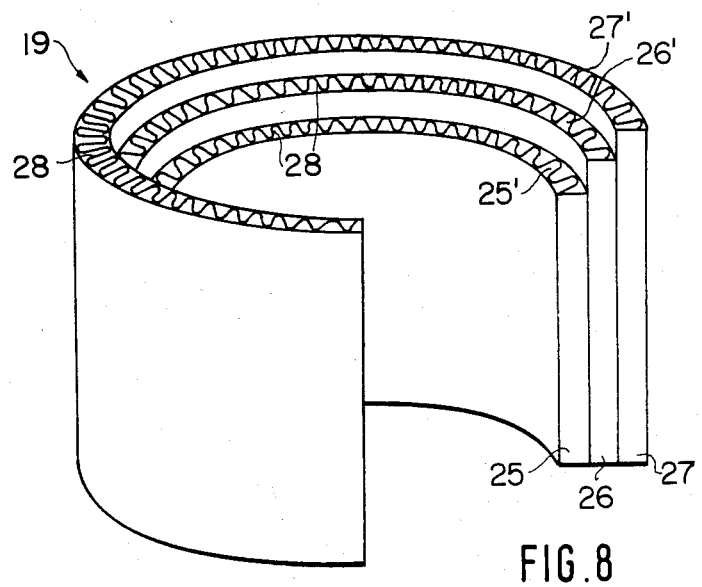
FIG. 8 is a cylindrical heat insulating member suitable for cooperation with the cover of FIG. 7.

FIG. 7 illustrates a heat insulating cover 18 for a heat insulating cowl 19 shown in FIG. 8. The cover 18 comprises, for example, four layers 20, 21, 22, and 23 cut from intermediate members as shown in FIG. 2. These layers have increasing diameters from the bottom up so that a stepped configuration is formed to fit into a similarly stepped configuration in the cowl 19. The top of the cover 18 comprises a cover film or sheet 24 of the same material as the cover sheet 1. The stepped configuration of the cowl 19 is formed by nesting three cylindrical members 25, 26, and 27 within each other, whereby the axial length of these cylindrical members is selected to form the respective steps 25', 26', and 27' fitting into the corresponding steps of the cover 18. The intermediate members for forming the cover 18 and the cowl 19 are made of the same materials as described above. The cylindrical shells or members 25, 26, 27 of FIG. 8 are very stiff in the axial direction since the corrugations 28 in all three cylindrical shells extend in parallel to the vertical central axis of the cylindrical cowl. Additionally, this type of structure is stiff against bending as well as against torsional stress. This strength is even enhanced by adhesively bonding the nesting shells or members 25, 26, 27 to each other. It should be noted here, that the construction shown in FIG. 8 employing the three cylindrical shells may also be achieved by a winding operation as illustrated in FIGS. 5a and 5b. The cowl or shell 19 in combination with the cover 18 form an insulation cowl for a hot isostatic press (HIP) or for a hot pressing plant. Both the cover 18 and the cylindrical cowl member 19 are made of the same intermediate materials or members as shown in FIG. 2. Referring again to FIGS. 3 and 4 it will be noted that the arrangement of the longitudinal axes of the ducts or channel spaces 10, 10' in two or several directions is best accomplished in a final form having a substantially flat shape. However, these shapes may even be slightly curved if the curvature is imparted to the final form prior to the curing. For biaxially curved shells and shapes the nap or burl profiled second film is preferable. It has been found that the walls of the profiled second film or sheet 2a, 2b form excellent reinforcements in addition to providing duct channels for separately flowing gas volumina. As a result, these intermediate members and final forms are very suitable for a so-called lightweight structure for use, for example, as gas turbine components for operation in the hot zones. However, this type of structure is also very well suited for use as rigid heat insulating bodies, for example, as shown in FIGS. 7 and 8, whereby such cowls may be used for high temperature treatment chambers and press processes including sintering furnaces, hot isostatic presses, isothermal forging methods, and the like. An additional advantage is achieved due to the fact that the silicon carbide is very slow to enter into any reactions as compared to heat insulating devices exclusively of carbon.

The plane films or sheets 1 form the separation membranes between the hot and cold gas in heat exchangers. The profiled foils or sheets 2 function as interconnecting lands and thus stabilize the plane films 1. Simultaneously, the profiled films or sheets 2 are soft relative to shearing stress and are thus capable of reducing thermal stress in the plane films or sheets 1. An additional advantage of the profiled films 2 is their ability to channelize or separate the gas flows within the zone defined by the members 5 without causing any appreciable pressure losses. A further advantage of this structure is seen in that the profiled films 2a, 2b provide large specific surfaces which is very desirable for heat exchangers and catalyst carrier bodies.

Other advantages of the invention are seen in that the ceramic intermediate member and final form is suitable for use in constructing many different structural components exposed to thermal stress such as components for combustion engines, gas turbines, rocket motors, furnace equipment, and the like. In all of these instances the present structures are suitable for heat insulating purposes, gas conduit purposes and/or heat exchange purposes as well as for carrying catalysts for reaction purposes. Thus, the present structure may form a guide vane for a turbine or a combustion pipe for heating or furnace equipment and the like.

The embodiments shown in FIGS. 7 and 8 are especially suitable for heat insulating cowls for hot isostatic presses and hot presses or for equipment used for heat treatments in a protective or inert gas environment. The sandwich type construction is especially suitable for this purpose since it simplifies the production, especially for heat exchangers. Even the roll up operation is simple, for example in constructing catalyst carrier bodies, and all the members of a heat exchanger are of the same construction as shown, for example, in FIGS. 1 and/or 2. Depending on the axial orientation of the individual elements relative to each other, a heat exchanger operating in counter-current flow or in cross-current flow is easily made.

Due to the profiled configuration of the second film or sheet as disclosed herein, the final form of the various components produced according to the invention comprises usually gas type isolation or separation planes which extend in parallel to each other as shown in FIG. 3, or in a cross-over relationship as shown in FIG. 4. Another advantage is seen in that the structural components according to the invention have a relatively smooth surface, thereby providing a large heat reflection radiation on the one hand and small flow pressure losses. Further, due to the interconnecting wall surfaces of the second film or sheet 2a, 2b, it is assured that heat expansions in all directions of space are taken up elastically by these interconnecting walls forming part of the structure. All these advantages result from an inexpensive manufacturing method for structural components capable of taking up thermal stress for many different and various purposes.

Although the invention has been described with reference to specific example embodiments, it will be appreciated, that it is intended to cover all modifications and equivalents within the scope of the appended claims.

What is claimed is:

1. A method for manufacturing a ceramic body for use under thermal stress operating conditions, comprising the following steps:
    (a) providing a first plane film made of a matrix material holding a carbon material content within the range of 50% to 80% by weight of said matrix material, said first plane film being in a still deformable state,
    (b) providing a second profiled film also made of material including a carbon material content within said range, said second profiled film also being in a deformable state,
    (c) arranging said first plane film on one side of said second profled film to form hollow spaces between said first and second films,
    (d) bonding said first and second films to each other at bonding locations where said first and second films contact each other to form an intermediate member in which said hollow spaces are located between adjacent bonding locations,
    (e) shaping said intermediate member into a desired final shape,
    (f) curing the final shape,
    (g) heating the final shape in an enclosed heater to a temperature within the range of 600° C. to 1000° C. while excluding air from said heater, said temperature being sufficient for coking or carbonizing said carbon material to provide a carbonized final form,
    (h) exposing said carbonized final form to a silicon containing substance, which upon further heating will be decomposed to leave elementary silicon metal,
    (i) and then further heating said carbonized final form including said silicon material to a temperature in the range of 1350° C. to 1800° C. sufficient to react the carbon material and the silicon metal to product silicon carbide (SiC) as an integral component of said ceramic body.

2. The method of claim 1, wherein the temperature of said first heating step (g) is sufficient to burn out of said first and second films any materials other than said carbon content.

3. The method of claim 1, further comprising impregnating said carbonized final form with a suitable carbon containing material for further carbonizing said final form to increase the carbon material content within said range of carbon material.

4. The method of claim 1, comprising using fiber reinforced films still in a deformable state as said first and second films.

5. The method of claim 1, comprising interconnecting a plurality of such intermediate members to each other prior to said curing step.

6. The method of claim 1, further comprising covering the other side of said profiled second film with a still deformable third film similar to the first plane film of a material also containing a carbon content to thereby sandwich said second film between said first and third films to form further hollow spaces between said second and third films, and further bonding said second and third film to each other prior to said curing step of said final shape.

7. The method of claim 6, comprising using as said first, second, and third still deformable films, sheets of thermoplastic or thermosetting materials having a carbon content within the range of 50% by weight to 65% by weight of the sheets.

8. The method of claim 6, comprising using as said first, second and third still deformable films, sheets of organic fibers impregnated with a resin including a carbon content within the range of 60% by weight to 80% by weight of the resin.

9. The method of claim 6, comprising using as said first, second and third still deformable films, sheets of inorganic material impregnated with a resin including a carbon content within the range of 60% by weight to 80% by weight of the resin.

10. The method of claim 9, further comprising using as said first, second and third still deformable films, sheets of thermoplastic resin or of thermosetting resin, and adding to said thermoplastic or thermosetting resin prior to making said sheets, a proportion of silicon carbide powder in the range of 100% by weight to 300% by weight of the thermoplastic or thermosetting resin.

11. The method of claim 6, further comprising using as said first, second and third still deformable films, sheets of resin impregnated materials, and adding to said resin, prior to impregnating said materials, a proportion of silicon carbide powder in the range of 50% by weight to 150% by weight of said resin.

12. The method of claim 6, further comprising using as said first, second and third still deformable films, sheets made of a mixture of thermoplastic or thermosetting material, and a proportion of short fibers in the range of 5% by weight to 40% by weight of the thermoplastic or thermosetting material.

13. The method of claim 6, further comprising preparing said first, second and third still deformable films by laminating a thermoplastic or thermosetting material to a substrate and then making said first film plane and profiling said second film and third films.

14. The method of claim 13 wherein said substrate is formed of an organic or inorganic material.

* * * * *

UNITED STATES PATENT AND TRADEMARK OFFICE
CERTIFICATE OF CORRECTION

PATENT NO. : 4,617,072
DATED : October 14, 1986
INVENTOR(S) : Herbert Merz

It is certified that error appears in the above-identified patent and that said Letters Patent is hereby corrected as shown below:

In the Abstract: line 4, replace "pegs" by --pregs--;
line 16, replace "SI" by --Si--.

In the Claims:

Claim 1, (Column 9, line 14) replace "profled" by --profiled--;
(Column 9, line 40) replace "uct" by --uce--.
Claim 3, (Column 9, line 46) replace "impreg-" by --reimpreg- --.
Claim 6, (Column 10, line 11) replace "film" by --films--.
Claim 10, (Column 10, line 28) replace "9" by --6--.
Claim 12, (Column 10, line 44) delete ",".

Signed and Sealed this

Twenty-third Day of December, 1986

Attest:

DONALD J. QUIGG

Attesting Officer     Commissioner of Patents and Trademarks